US007365843B2

(12) United States Patent
Frick et al.

(10) Patent No.: US 7,365,843 B2
(45) Date of Patent: Apr. 29, 2008

(54) SPECTRAL PHOTOMETER AND ASSOCIATED MEASURING HEAD

(75) Inventors: Beat Frick, Bern (CH); Paul Schenkel, Watt (CH)

(73) Assignee: X-Rite Europe AG, Regensdorf (CH)

( * ) Notice: Subject to any disclaimer, the term of this patent is extended or adjusted under 35 U.S.C. 154(b) by 457 days.

(21) Appl. No.: 10/894,797

(22) Filed: Jul. 20, 2004

(65) Prior Publication Data

US 2005/0052648 A1  Mar. 10, 2005

(30) Foreign Application Priority Data

Jul. 23, 2003  (EP)  ................................. 03016535

(51) Int. Cl.
*G01J 3/42* (2006.01)
*G01J 3/46* (2006.01)
(52) U.S. Cl. ..................... 356/319; 356/320; 356/328
(58) Field of Classification Search ........ 356/319–330, 356/402, 406
See application file for complete search history.

(56) References Cited

U.S. PATENT DOCUMENTS 6,147,761 A * 11/2000 Walowit et al. ............. 356/425
6,809,855 B2 * 10/2004 Hubble et al. .............. 359/320
6,844,931 B2 * 1/2005 Ehbets ....................... 356/328
7,113,281 B2 * 9/2006 Ott ............................ 356/418

2002/0122192 A1  9/2002  Ott .............................. 358/1.9

FOREIGN PATENT DOCUMENTS

| EP | 0 764 836 A2 | 3/1997 |
| EP | 1 103 799 A2 | 5/2001 |
| EP | 1 314 972 A1 | 5/2003 |

OTHER PUBLICATIONS

ASTM International: "Standard Practice for Obrtaining Spectrometric Data for Object-Color Evaluation" (2002).

* cited by examiner

*Primary Examiner*—Layla G. Lauchman
(74) *Attorney, Agent, or Firm*—McCarter & English, LLP

(57) ABSTRACT

A spectral photometer intended for integration purposes includes a measurement head equipped with illumination arrangement including at least one light source for the illumination at an angle of incidence of 45° of a measured object and located in a measurement plane, a pickup arrangement for capturing the measurement light remitted by the measured object at an angle of reflection of essentially 0° relative to the perpendicular to the measurement plane, a spectrometer arrangement including an entry aperture for the spectral splitting of the measurement light captured and fed through the entry aperture, and a photoelectric receiver arrangement exposed to the split measurement light for conversion of the individual spectral components of the measurement light into corresponding electrical signals. It further includes an electronic circuit for control of the light source and forming digital measurement values from the electrical signals produced by the photoelectric receiver arrangement.

36 Claims, 5 Drawing Sheets

SPECTRAL PHOTOMETER AND ASSOCIATED MEASURING HEAD

FIELD OF THE INVENTION

The invention relates to a spectral photometer and a measuring head for a spectral photometer. More particularly, the present invention relates to a spectral photometer intended to be built into color ready reproduction devices, especially color printers.

More concretely, the present invention relates to a spectral photometer intended to be built into color ready reproduction devices, especially color printers.

BACKGROUND ART

Color tables (so called test charts) are printed out for the characterization, ink limitation, linearization and profiling of ink jet color printers, and thereafter measured with a manual or automatic color measurement device. Spectral photometers with 45°/0° geometry are thereby used as color measuring devices and the data used are typically L*a*b* or a spectral remissions in the range of 380 nm to 730 nm. Suitable color measurement devices are, for example, the apparatus "Spectrolino" and "i1" of the company Gretag-Macbeth AG, Regensdorf, Switzerland.

Ink limitation and linearization are typically included in the software of the printer, whereby certain printers, for example of the companies Hewlett Packard and Xerox, already include built-in sensors with densitometer functions for the automatic linearization.

ICC profiles are created as known by way of a color management software (for example "Profile Maker" of the company Logo GmbH) on the basis of the measurement data of the color tables.

Ink limitation, linearization and profiling are dependent on different influence factors, for example the condition of the print head, paper type and paper batch, ink type and ink batch, print modus, printer registration, ambient conditions such as temperature and humidity. Preset parameters are generally used for the ink limitation and linearization. The deviations from the nominal value which result from the spread of media batches and the ambient conditions are compensated by the profile. Generic and preset profiles for all possible combinations of media and print modi are however not or at least not always sufficient, which is why in practice upon higher quality demands manually additional local profiles are generated and used.

In order to simplify these actions, it would be desirable to provide a color printer with a built-in measurement device so that the complete characterization (ink limitation, linearization, profiling) for all media (inks, paper) can occur without additional auxiliary devices and manual measurement processes.

A measurement device suitable for this use must fulfill very high demands. Apart from the usual demands with respect to standardized measurement geometry, spectral range, exactness and Constance (repeatability of the measurement results) it must be able to deliver spectral data, colorimetric data and standardized or specific color density data. These requirements can be definitely fulfilled with the currently commercially available spectral photometers, for example the above-mentioned devices "Spectrolino" and "i1" of the company Gretag-Macbeth AG. However, additional limitations still exist with a built-in device with respect to the installation mass (compact shape) and possibly the weight. Furthermore, increased demands exist regarding ambient conditions (temperature, humidity) and the danger of soiling in the vicinity of the printing works (dust, color mist, etc.). Furthermore, the measurement cannot occur in direct physical contact with the medium, since, for example, in ink jet printers the print is humid and mechanically sensitive for a certain amount of time. A built-in device must also be insensitive to mechanical vibrations and have long-lived light sources. Since the spacing from the measured object is subject to variations because of the non-permissible direct physical contact with the measurement device, the measurement device must also be able to handle that. Finally, service friendliness and commercial criteria also play an essential role, since such measurement devices are required in large quantities and therefore able to be economically manufactured. It is therefore especially required that the assembly can be done at the lowest installation and adjustment cost.

SUMMARY OF THE INVENTION

It is now an object of the present invention to provide a spectral photometer or a measuring head for a spectral photometer which is suitable for installation into a color reproduction device, especially a printer and fulfills the above-described requirements.

This object underlying the present invention may be achieved by the spectral photometer having a measuring head that has an illumination arrangement with at least one light source for the illumination of a measured object at an angle of incidence of 45° and located in a measurement plane. The measuring head also has a pickup arrangement for capturing the measurement light remitted by the measured object at an angle of reflection of essentially 0° relative to the perpendicular to the measurement plane. Further, the measuring head has a spectrometer arrangement with an entry aperture for the spectral splitting of the measurement light captured and fed through the entry aperture and a photoelectric receiver arrangement exposed to the split measurement light for conversion of the individual spectral components of the measurement light into corresponding electrical signals. An electronic circuit for control of the light source and forming digital measurement values from the electrical signals produced by the photoelectric receiver arrangement may also be provided with the at least one light source being constructed as a cosine emitter and located in such a way that its main radiation direction is essentially parallel to the main beam of the remitted measurement light and the mean distance of the light source from the main beam of the remitted measurement light is essentially the same as the distance of the light source from the measurement plane.

The object underlying the present invention may also be achieved by the measuring head as described above with respect to the spectral photometer. Preferred embodiments and further developments of the spectral photometer and/or the measuring head in accordance with the present invention may advantageously include but not necessarily be limited to the light source having a combination of two or more light emitting diodes of different spectral characteristics located in one plane and preferably positioned on a common carrier, the pickup arrangement having a lens and an integrator rod made in one piece, a bright reference arrangement provided to be removably insertable into the beam path between the illumination arrangement and the pickup arrangement, the spectrometer arrangement having a pot-shaped spectrometer housing with an essentially cylindrical mantle and a removable cover and a concave diffraction grating positioned coaxially to the mantle in the spectrometer housing, the spectral photometer being athermalized, the spectral photometer provided with a further photoelectric receiver, and/or the spectral photometer provided with a control suitable for maintaining a temperature of the light source constant (e.g., by variation of the on and off time) and, determining as a measure for the temperature of the light emitting diodes included in the light source the flow through voltage of the light emitting diodes.

Preferred embodiments and further developments of the spectral photometer in accordance with the invention and the measuring head in accordance with the invention are the subject of the dependent claims.

BRIEF DESCRIPTION OF THE DRAWINGS

The invention is further described in the following with reference to the drawing. It shows.

DETAILED DESCRIPTION OF THE PREFERRED EMBODIMENTS

Figure 1:
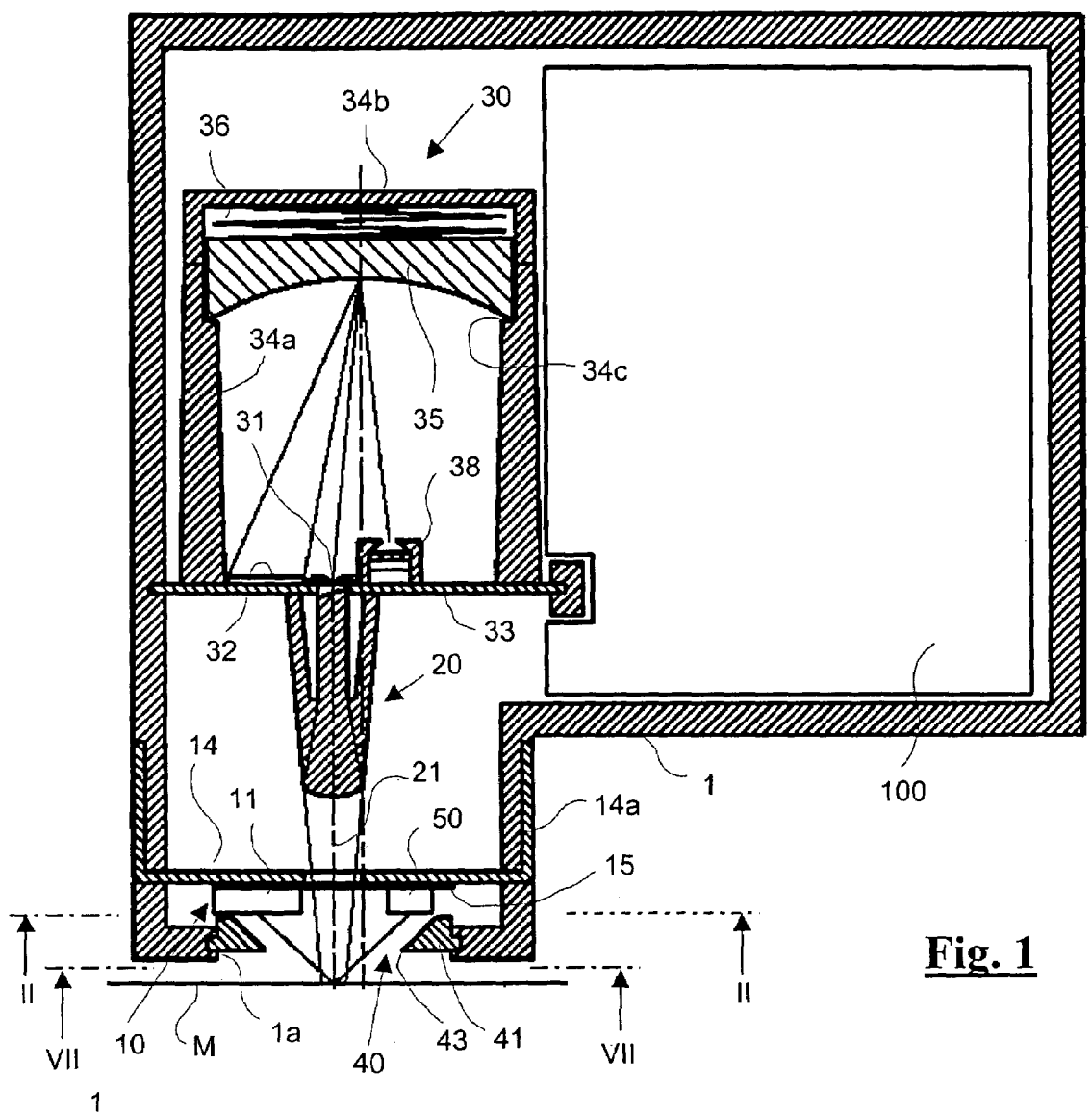
FIG. 1 a longitudinal section through an exemplary embodiment of the spectral photometer in accordance with the invention.
Figure 5:
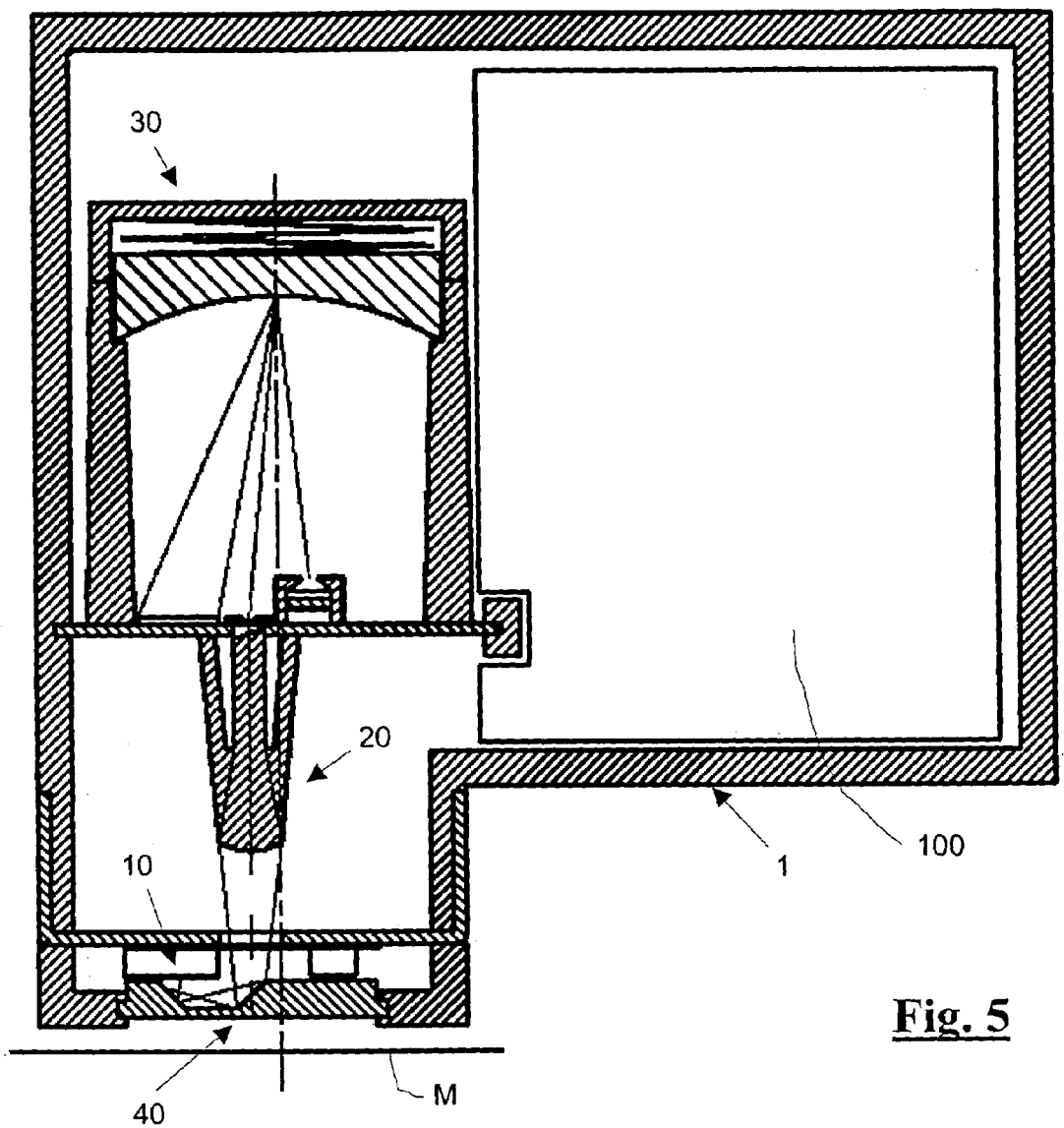
FIG. 5 a longitudinal section analog to FIG. 1, however with a bright reference arrangement in the radiation path.

The spectral photometer includes as illustrated an outer housing 1 in which all mechanical, optical and electrical components of the spectral photometer are housed. The housing 1 has at its lower end (in the drawing) an opening 1a, through which the measurement beam path extends during operation (FIG. 1). The opening 1a is outside the operation closed by a bright reference arrangement 40 which at the same time functions as a closure (FIG. 5). The measurement plane in which a measurement object O to be measured is located in practical operation is labeled M.

The components of the spectral photometer are an illumination arrangement 10 for the illumination of the measured object O found in the measurement plane M under an angle of incidence of essentially 45°, a pickup arrangement 20 for the capture of the measurement light remitted from the measured object O at an angle of reflection of essentially 0° relative to the perpendicular of the measurement plane M, a spectrometer arrangement 30 for the spectral splitting of the measurement light captured by the pickup arrangement 20 and guided thereto through an entry aperture 31, a photoelectric receiver arrangement 32 provided within the spectrometer arrangement 30 and exposed to the spectrally split measurement light for the conversion of the individual spectral components of the measurement light into corresponding electrical signals and an electronic circuit 100, which controls the illumination arrangement 10 and forms digital measurement values (spectral data, color data, color density data, etc.) from the electrical signals produced by the photoelectric receiver arrangement 32 and makes them available for further use at a not illustrated digital interface.

Insofar the spectral photometer of the invention corresponds in the principle conception and function fully and totally to previous spectral photometers of this type, such as the above-mentioned device "i1" of the company Gretag-Macbeth AG, so that the person skilled in the art does not require any further explanation. The differences of the spectral photometer of the invention from the prior art reside in the specific construction of the individual components, which specific construction then makes it suitable for use as a built-in measurement device for a printer, for example.

Figure 3:
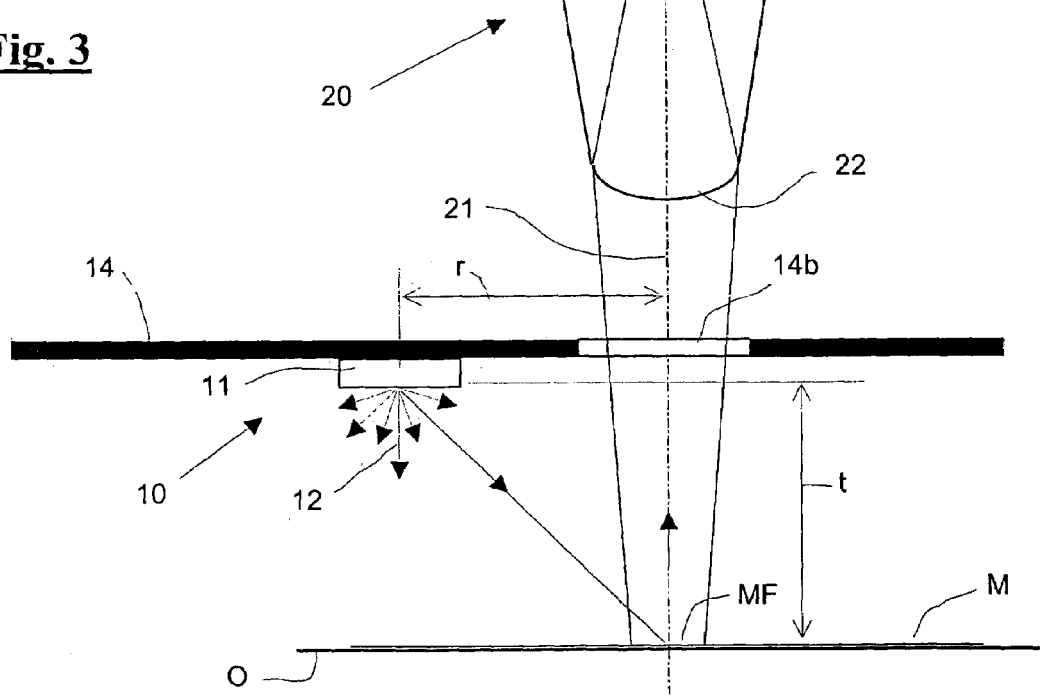
FIG. 3 a schematical illustration of the radiation paths of the illumination and pickup arrangement of the spectral photometer.

A first important aspect of the invention relates to the conception of the illumination arrangement 10. It includes a light source constructed as a cosine emitter, i.e., an illuminator that generates cosine-shaped distribution in forward three-dimensional directions. This is illustrated in FIG. 3. The mean or main direction of the radiation of the light source 11 is labeled 12 in FIG. 3 and is normally perpendicular to the plane of the planar light source 11.

Figure 2:
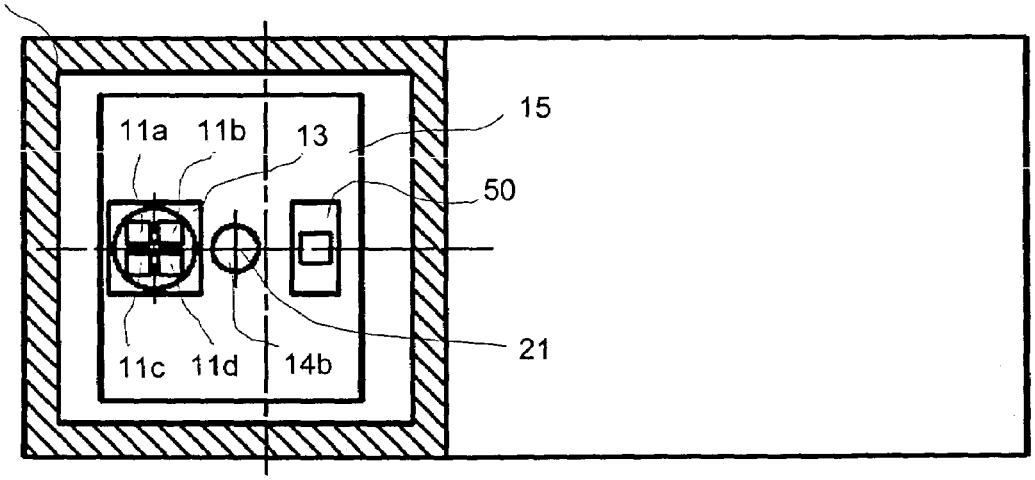
FIG. 2 a section along line II-II of FIG. 1.

The light source 11 is preferably implemented by one or several light-emitting diodes 11a-11d, as is best apparent from FIG. 2. When only one light-emitting diode or several identical light-emitting diodes are used, a "white" radiating type is best used which covers the whole spectral range required for the spectral measurements. However, a combination is preferably used of one or several "white" light-emitting diodes with one or several light-emitting diodes of a different spectral characteristic which mutually compliment one another with respect to the spectral range to be covered. The same effect can also be achieved with a combination of several different, essentially single color light-emitting diodes. The light source 11 can also include a UV-light-emitting diode which can be separately switched on as desired.

The ("naked") light-emitting diodes of the light source 11 are mounted on a common carrier (chip) 13 as is apparent from FIG. 2. This carrier 13 consists preferably of a good heat conducting material and sits on a printed circuit board 15. It is mounted on a metal plate 14 which is positioned in the lower portion of the housing 1 parallel to the measurement plain M and simultaneously serves as cooling surface for the light source 11 or the light-emitting diodes 11a-11d forming it. The metal plate 14 is provided with lateral wall portions 14a for enlargement of the effective cooling surface, which are located at the surface of the housing 1 and improve the heat conductance. The light source 11 is connected with the circuit 100 through not illustrated electrical conduits and is controlled thereby, whereby also a selective control of the individual light-emitting diodes 11a-11d can be provided.

The planar light source 11 is "flat", which means mounted with its flat side parallel to the measurement plane M (which means perpendicular to the optical axis of the pickup arrangement 20), so that the mean or main radiation direction 12 also extends perpendicular to the measurement plane M. The light source 11 is furthermore positioned on the metal plate 14 such that the mean distance r of the light source 11 from the main beam 21 of the remitted measurement light (optical axis) is essentially the same size as the distance t of the light source 11 from the measurement plane M. The measurement spot MF in the measurement plane M is therefore only exposed to that light portion emitted from the light source 11 at essentially 45° degree in direction of the measurement spot and according to standard under an angle of incident of essentially 45° degree. Because of the construction of the light source 11 as a cosine emitter and its previously mentioned "flat" orientation, not all of the total light is used for the illumination of the measurement spot, but this illumination concept is within the framework of the common exactness requirements relatively insensitive to variations of the spacing of the measurement object from the light source. It is a further important advantage that for the illumination arrangement 10 only few components are required and that they can be mounted very easily and uncritically. Light-emitting diodes furthermore have the advantage of high robustness and longevity, which contributes to the service friendliness of the spectral photometer.

It is understood that several light sources 11 can also be provided if needed, whereby they are then distributed along a circle around the optical axis 21 of the pickup arrangement 20. In the case of several light sources, their spectral characteristics can be differently selected. Especially, it can be advantageous to provide a separate light source for the UV range.

A further important aspect of the invention relates to the conception of the pickup arrangement 20 for the measurement light remitted from the measured object O, the light path of which extends through an opening 14b in the center of the metal plate 14. The pickup arrangement 20 has the task to capture the measurement light remitted from the measured object O under a standard angle of reflection of essentially 0° relative to the perpendicular of the measurement plane M and to guide it into the entry aperture 31 of the spectrometer arrangement 30. The pickup arrangement 20 is constructed as a one piece transparent plastic body which has a convexly curved entry surface 22 and coaxial thereto an essentially cylindrical light conducting rod 23 as well as an also coaxial, conical installation pipe 24. The installation pipe 24 has no optical function and serves only for the reduction of light scatter and for the mounting of the pickup arrangement on the printed circuit board 33 held stationary in the housing 1. Instead of the mounting of pipe 24, spreaders or similar fastening means can also be provided.

The convexly curved entry surface 22 of the pickup arrangement acts as a lens, which images the measurement spot MF into the entry plane 23a of the light guide rod 23 (FIG. 3). The size of the entry surface 23a of the light guide rod 23 and the imaging scale of the lens formed by the entry surface 22 determine the size of the measurement spot MF effectively "seen" by the pickup arrangement 20 (typically about 4 mmØ). The illumination arrangement 10 thereby covers a larger region of the measured object extending beyond the measurement spot MF ("over exposure").

The light guiding rod 23 acts as an integrator over the whole surface of the measurement spot MF and thereby evens out inhomogeneities. It guides the measurement light picked up and fed therein to into the input gap 31 of the spectrometer arrangement 30. It is somewhat slanted at the output end in order to achieve the light deflection of the measuring light from the optical axis which is required for an optimal illumination.

The pickup arrangement 20 consists preferably of only one part, easily made, for example, by injection molding, which can be very easily installed in the spectral photometer. It limits the measurement spot and evens out inhomogeneities, so that no requirements are placed on the illumination arrangement in this respect, and the latter can thereby be very easily realized.

A further important aspect of the invention relates to the construction of the spectrometer arrangement 30. It includes in a generally conventional manner a light sealed spectrometer housing 34, the only opening of which is the already mentioned entry aperture 31. A concave diffraction grating 35 is found in the spectrometer housing 34 as well as the also already mentioned photoelectric receiver arrangement 32, which typically consists of a photo diode line with, for example, 128 individual photo diodes and is also mounted on the already mentioned printed board 33. The measurement light captured by the pickup arrangement 20 and guided through the entry aperture 31 into the spectrometer arrangement 30 and is split by the latter into its spectral portions. The spectrally split measurement light falls on the photoelectric receiver arrangement 32 and is converted by the latter into corresponding electrical signals, whereby a different spectral portion can be picked up on each individual photo diode. The photoelectric receiver arrangement is positioned for this purpose at the location of the first order diffraction. The electrical signals produced by the individual photo diodes of the photoelectric receiver arrangement 32 are guided to the electronic circuit 100 through not illustrated conduits and processed therein in a generally known manner and digitalized and converted to the required digital measurement values (spectral measurement values, color measurement values, color density measurement values etc.).

The spectrometer housing 34 is pot-shaped and includes an essentially cylindrical mantle 34a and a cover 34b removably mounted thereon. An annular shoulder in 34c is provided at the inside of the mantle 34a on which the diffraction grating 35 rests with its edge. The annular shoulder 34c is thereby formed ball shaped complementary to the concave edge of the diffraction grating 35 so that a clean engagement results. A small hollow space exists between the cover 34b and the diffraction grating 35 in which a compression spring 36 is found. The latter rests against the inside of the cover 34b and forces the diffraction grating 35 with a predefined constant force against the annular shoulder 34c. The diffraction grating 35 is positioned coaxial to the mantle 34a. That causes the entry aperture 34 to lie outside the optical axis of the diffraction grating 35 and the measurement glide beam exiting the entry aperture 31 to be somewhat inclined to the optical axis. At the same time, the photoelectric receiver arrangement 32 must be positioned on the same side of the optical axis of the diffraction grating 35 as the entry aperture. The optical axis of the pickup arrangement 20 is also somewhat offset from the optical axis of the diffraction grating 35.

The pot-shaped spectrometer housing 34 sits on the already mentioned printed circuit board 33 and is closed light tight thereby at its underside opposite the cover 34b. The entry aperture 31 is either formed by a corresponding slit in the printed circuit board 33 or preferably, as illustrated, implemented by way of a gap element mounted on the printed circuit board 33 above a suitable through passage and in the latter. Downwardly protruding pins 34d are formed on the inside of the mantle 34, which extend into corresponding openings 33d in the printed circuit board 33. The pins 34d and the openings 33d form cooperating complementary positioning agents which center the spectrometer housing 34 on the printed circuit board 33. A pair of cooperating positioning agents are formed as a fixed support and the other as a slideable support. The line connecting the fixed and slideable supports is oriented perpendicular to the dispersion direction of the spectrometer (visible in FIG. 4) and remains unchanged during temperature fluctuations, which means at different expansion of spectrometer (spectrometer housing and diffraction grating) and printed circuit board (ceramic with small heat expansion cord efficient). The line position and direction is, as described for example in EP-A 1 041 372, fixed in such a way that the location of the spectrum on a detector 32 is not changed upon a heat expansion caused, for example, by a temperature increase, of the spectrometer, the grating and the printed board. The spectrometer is thereby isothermalized by the correct selection of the location of the two positioning agents.

Figure 4:
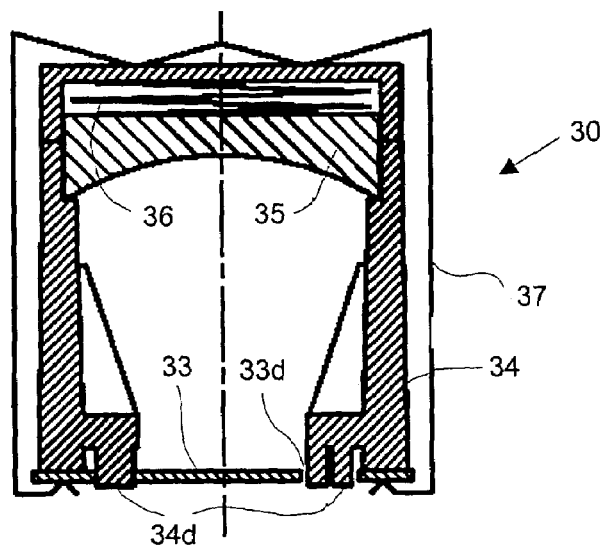
FIG. 4 a longitudinal section rotated by 90° relative to the one of FIG. 1 through the spectrometer housing of the spectral photometer of FIG. 1.

The spectrometer housing 34 is fastened on the printed circuit board 33 by way of a clamping spring 37 which on the one hand spans the cover 34*b* and on the other hand grips around the printed board 33 as is apparent from FIG. 4. At the same time, the cover 34*b* is also held by the clamping spring 37 on the mantle 34*a* of the spectrometer housing 34. Since the spectrometer housing is not rigidly connected with the printed circuit board, but only forced with a predefined force onto the printed circuit board, the spectrometer housing and the printed circuit board can differently thermally expand unimpeded, whereby the spectrometer housing can slide on the very smooth surface of the ceramic printed plate.

The illustrated construction of the spectrometer arrangement 30 allows an extremely simple manufacture (for example as plastic injection moulding parts) and requires especially no adjustment. The printed circuit board 33 consists preferably of a ceramic material and is therefore subjected to very small and defined thermally caused dimension changes (expansion). The positioning of all critical parts is oriented exclusively on the printed circuit board 33 and can be easily guaranteed by correspondingly precisely formed and positioned positioning aids on the printed board without subsequent adjustment.

It can be required for some measurement tasks to capture the whole, which means not spectrally split, measurement light. For that purpose, a further photoelectric receiver 38 is positioned in the spectrometer arrangement 30 on the printed circuit board 33 at the location of zero order diffraction and also connected with the electronic circuit 100. This photo receiver 38 can optionally also be provided with a conversion filter which enables the measurement in metric data (for example Lux).

Each non-isothermalized or not perfectly isothermalized spectrometer has a certain spectral drift because of material properties (thermal expansion, humidity). This drift can be mathematically compensated in a generally known manner by way of a spectrally stabilized reference light source. A narrow band light emitting diode is preferably used as reference light source in connection with a temperature stable dicroitic filter. The coupling in of the reference light can occur in different ways. The reference light source is easiest realized as additional measurement light source, whereby the reference light in that case is input into the spectrometer through the bright reference arrangement. However, the reference light source is preferably positioned within the spectrometer housing close to the entry aperture 31.

In other measurement technological applications it is desired to capture the light reflected directly from the measured object (glare). For this purpose, a further photoreceptor 50 is positioned on the metal plate 14 symmetrical to the optical axis 21 of the pickup arrangement and opposite the light source 11, which receives the measurement light reflected by the measured object at a standard angle of reflection of essentially 45°. This photoreceptor 50 is also connected with the electronic circuit 100. Optionally, a filter can be inserted into the light path of the photoreceptor 50 which can determine the spectrum of the observed glare.

According to a further aspect of the invention, the earlier mentioned bright reference arrangement 40 can be provided instead of the common white tile, which is positioned at a relatively large distance of typically about 2 mm above the measurement plane M. The bright reference arrangement consists essentially of a sled 41 which is slideable in the opening 1*a* of the outer housing 1 transverse to the optical axis 21 of the pickup arrangement 20 between a measurement position and a reference position, as is apparent from the two FIGS. 7*a* (measurement position) and 7*b* (reference position). The movement into the reference position is carried out, for example, by an external, here not illustrated drive agent and against the force of a spring 42 which maintains the sled 41 in the measurement position or moves it back into the measurement position upon removal of the exterior force application. The exterior drive agent is provided, for example, in the device in which the spectral photometer is inserted.

Figure 7B:
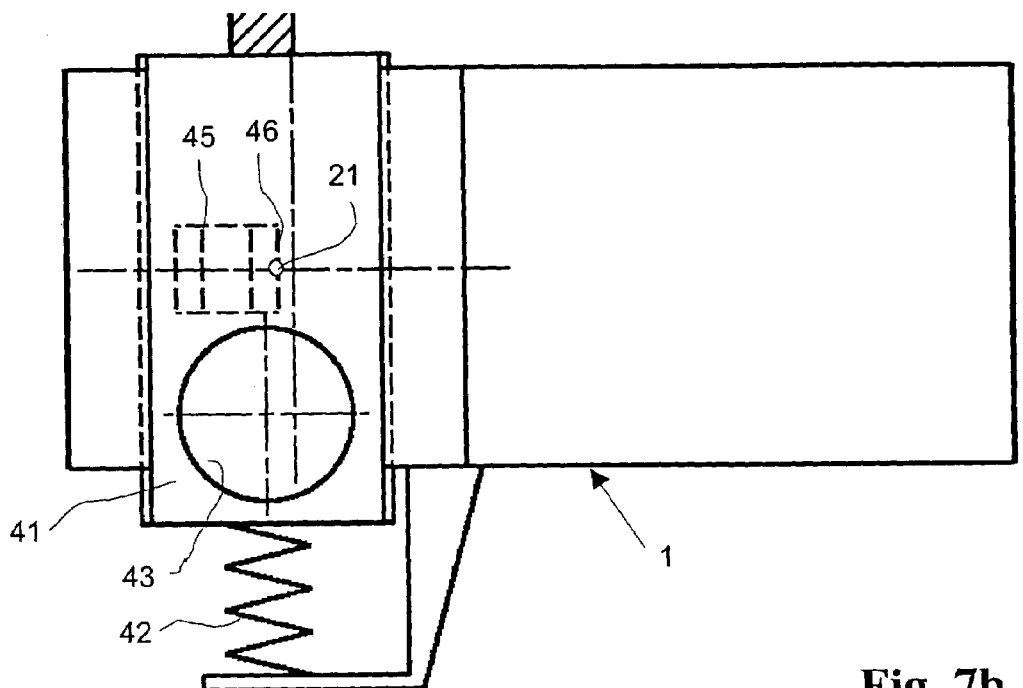
FIGS. 7a-b two views along line VII-VII of FIG. 1.
Figure 7A:
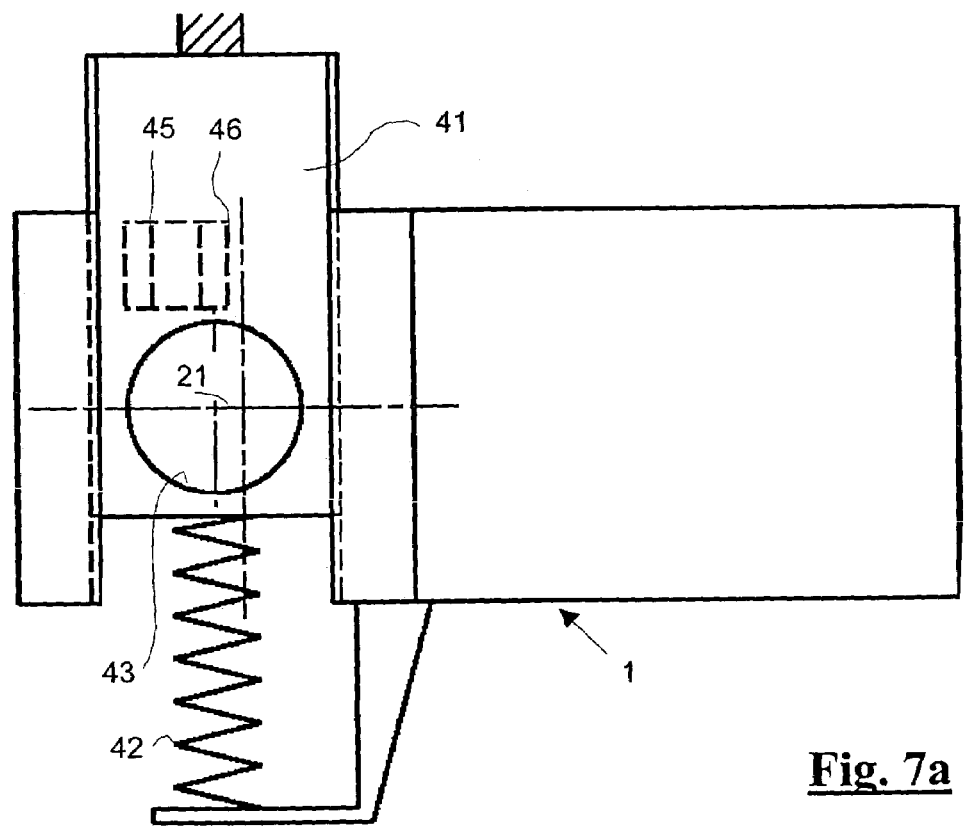

The sled 41 is provided with a circular through passage 43 the center of which in the measurement position of the sled 41 lies essentially in the optical axis 21 of the pickup arrangement 20 (FIG. 7*a*). The through passage 43 is sized sufficiently large so that the illumination light and the measurement light remitted by the measured object can pass unimpeded (FIG. 1).

Figure 6:
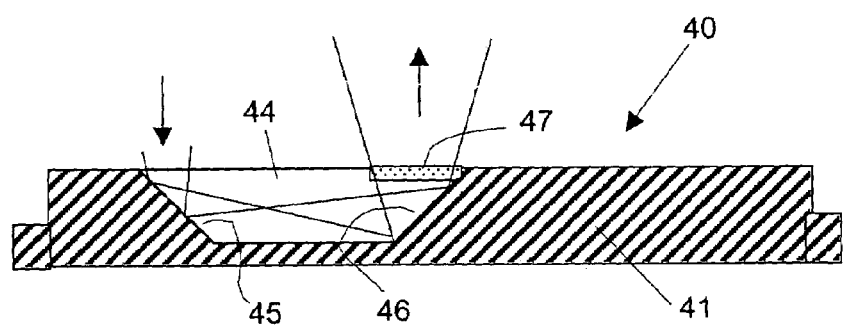
FIG. 6 the bright reference arrangement of FIG. 1 in enlarged illustration.

As shown in enlarged detail in FIG. 6, the sled 41 has a hollow space 44 at its upper side which is laterally defined by two redirecting mirrors 45 and 46. A reduction element 47 for example in the form of a scatter disk or a gray filter is positioned above the redirecting mirror 46 in the drawing on the right. The hollow space 44 is offset relative to the through opening 43 laterally and in displacement direction of the sled 41. When the sled 41 is in the reference position, the optical axis 21 of the pickup arrangement 20 extends essentially through the center of the redirecting mirror 46 and the light source 11 is located essentially above the center of the redirecting mirror 45 (FIG. 5). The light originating from the light source 11 enters into the hollow space 44, is redirected by a total of 180° by way of the two redirecting mirrors 45 and 46 and exits the hollow space through the reducing element 47 in direction to the pickup arrangement 20. The reducing element 47 serves the compensation of the intensity ratios of the measurement on the paper white to the bright measurement.

In a simpler construction, the total hollow space 44 can be formed of an optically diffusely scattering plastic. The light scattered into the pickup optic by way of the two 45° incline surfaces is in this case captured during the bright measurement.

In contrast to a white measurement with a well defined white tile at the exact measurement height (paper plane) the described bright measurements are relative measurements of the combination of spectral LED brightness, sensor sensitivity, etc. As a minimum, an absolute white calibration of the total system according to standard is required during the production of the sensor.

As is apparent from the proceeding, the spectral photometer is closed to the exterior when the sled 41 is in the reference position. The bright reference arrangement 40 functions therefore simultaneously as mechanical and optical closure (the latter, for example, for dark measurements). Due to the construction of the bright reference arrangement 40, it is also protected against soiling. Moreover, the free space between the spectral photometer and the measured object is maintained and the bright reference arrangement is accommodated within the enclosed space of the spectral photometer.

Figure 8:
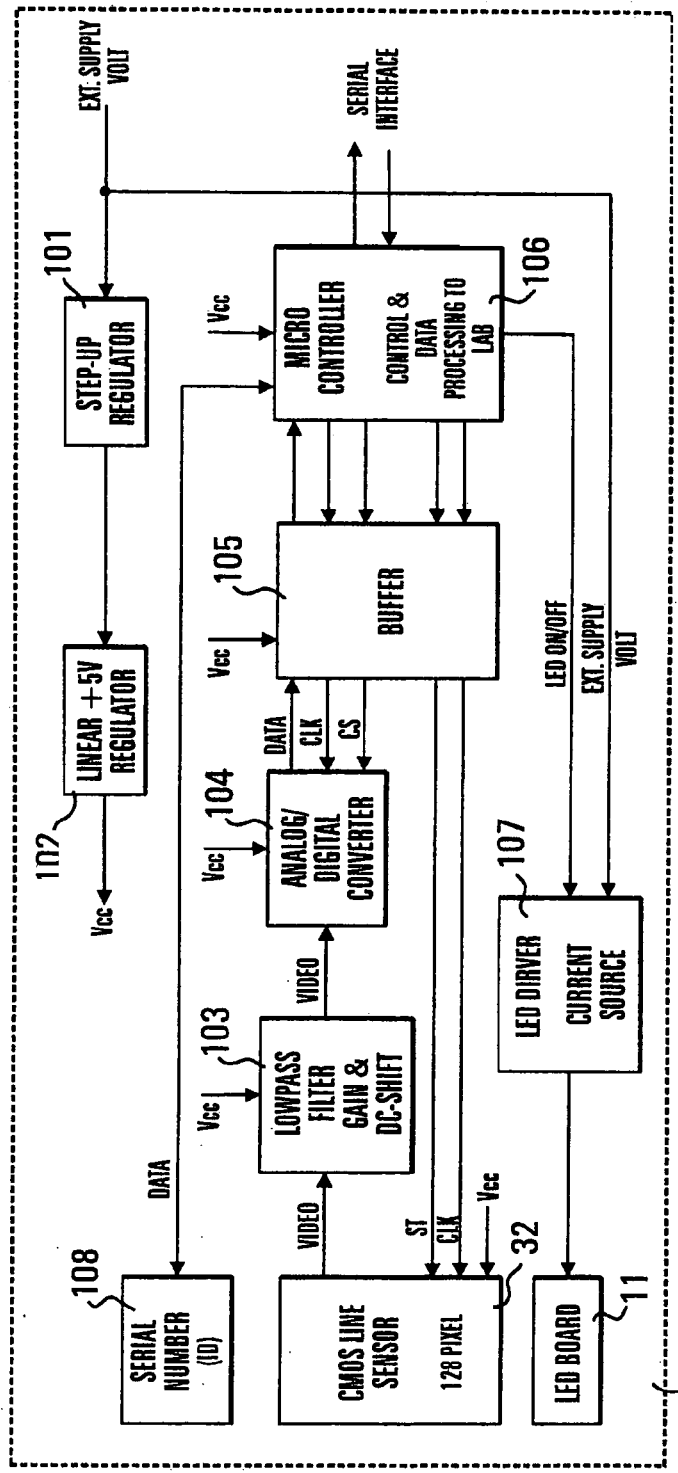
FIG. 8 a block schematic of the electronic circuit of the spectral photometer.

FIG. 8 shows in a block schematic the most important functional elements of the electronic circuit 100. The circuit includes apart from power supplies 101 and 102 an amplifier and level converter stage 103, an A/D converter 104, a buffer storage 105, a micro controller 106 and a lamp driver 107 as well as a serial number storage 108. The photoelectric receiver arrangement 32 is connected with its signal outputs to the amplifier and level converter step 103. The lamp driver 107 feeds the light-emitting diodes of the light source 11. If the spectral photometer, as described previously, is equipped with additional photo receivers and additional light sources, they are included in an analogous manner in the circuitry. The control of the individual functional elements and the functional processes occurs through a software stored in the micro controller 106. The electronic circuit is in its principle construction and in its function part of the prior art (compare, for example, the already mentioned spectral photometer "i1") and therefore requires no further description for the person skilled in the art.

A stable light source is of highest importance for a spectral photometer. With a conventional illumination by way of an incandescent lamp as light source, this problem can be relatively easily solved, by way of a stable power supply, among other things. However, when light-emitting diodes are used as light sources, the stability is often insufficient even for short periods of time. For stable conditions, it is required that the light emitting diodes are operated with constant power and at constant temperature. The latter is very difficult, since the temperature of a light-emitting diode cannot be easily measured, for example with a temperature sensor. This problem is now solved according to a further important aspect of the invention in that as a measure for the light-emitting diode temperature the (defined temperature dependent) flow through voltage (forward voltage) of the light-emitting diode is measured at a constant measurement current (typically 50 µA) which is significantly smaller than the normal operating current (typically 170-350 mA) and used for the temperature control. (Of course this measurement occurs in the pause between two measurements).

When the flow through voltage increases, which corresponds to a decrease in the light-emitting diode temperature, the switched-on duration of the light-emitting diode during the actual measurement operation of the spectral photometer is somewhat increased, whereby the temperature again increases. Upon an increase in temperature, the switched-on duration per measurement is conversely somewhat reduced, or the pause between two subsequent measurements is somewhat lengthened. In this manner, the temperature of the light-emitting diode can be relatively easily held constant. Especially, practically no additional circuit technological cost is required, since with the exception of the simple measurement current source, all required components (A/D converter, lamp driver, micro-processor) are present anyway in a modem digital spectral photometer (compare the preceeding description of the electronic circuit 100).

When the light source includes several light-emitting diodes, practically only the temperature of that light-emitting diode is measured which delivers the highest light contribution. Of course, the voltage and thereby the temperature can also be measured at each light-emitting diode.

Figure 9:
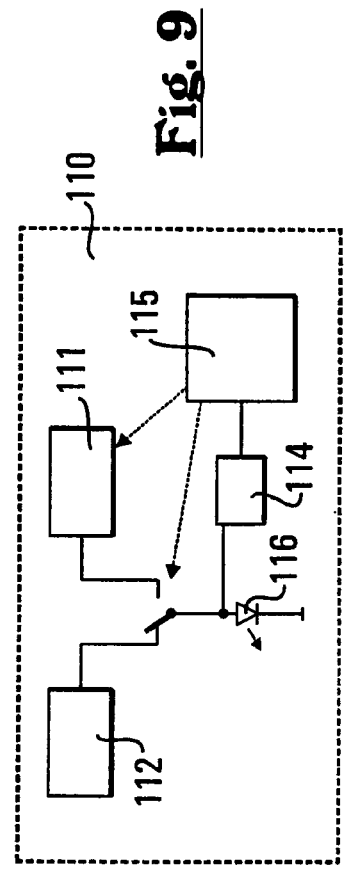
FIG. 9 a block schematic of the temperature regulation for the light source of the spectral photometer.

FIG. 9 shows a principle circuitry of a suitable control circuit 110. It includes a switchable constant operating current source 111, a constant measurement current source 112, a switch 113, an A/D converter 114 and a micro controller 115. The micro controller controls the constant operating current source 111 and the switch 113. The A/D converter 114 lies at the anode of the light-emitting diode 116 to be controlled and captures its flow through voltage, when the light-emitting diode 116 is connected by way of the switch 113 to the constant measurement current source 112. The micro controller 115 calculates on a basis of the captured flow through voltage the required switched-on or pause duration for the light-emitting diode 116 and correspondingly controls the constant operating current source 111. As is apparent, all components of the control circuit 110 with the exception of the constant measurement current source 112 are already present in the electronic circuit 100. Essentially only the software of the micro controller needs to be accordingly expanded.

Instead of keeping the temperature of the light-emitting diodes constant, the spectral measurement data can alternatively also be correspondingly temperature corrected. A reference spectrum is measured and stored herefor for each measured temperature. The measurement values can later be corrected with these referenced spectra. This approach requires however a significantly higher storage and calculation cost, but then loads the light-emitting diodes somewhat less.

Owing to its special construction and features the spectral photometer in accordance with the invention can be realized very compact and cost efficient and is especially suited for the use in ink jet printers (from simple office models up to very large formats), color sublimation printers, color copiers and other production machines, where color is a quality determining feature, for example, in printing machines. It can therein be used for all measurement tasks in which spectral, color and density measurement data must be determined. The measurement data produced thereby can then be analyzed for the most manifold tasks, especially also the printer characterization mentioned in the beginning.

Although exemplary aspects of the present disclosure have been described with reference to schematic illustrations herein, the present disclosure is not limited thereto. Rather, the various devices and systems disclosed herein are susceptible to modification and/or variation without departing from the spirit or scope of the present disclosure.

The invention claimed is:

1. Spectral photometer, comprising a measuring head equipped with an illumination arrangement including at least one light source for the illumination of a measured object at an angle of incidence of 45° and located in a measurement plane, a pickup arrangement for capturing the measurement light remitted by the measured object at an angle of reflection of essentially 0° relative to the perpendicular to the measurement plane, a spectrometer arrangement including an entry aperture for the spectral splitting of the measurement light captured and fed through the entry aperture, a photoelectric receiver arrangement exposed to the split measurement light for conversion of the individual spectral components of the measurement light into corresponding electrical signals, and an electronic circuit for control of the light source and forming digital measurement values from the electrical signals produced by the photoelectric receiver arrangement, the at least one light source being constructed as a cosine emitter and located in such a way that its main radiation direction is essentially parallel to the main beam of the remitted measurement light and the mean distance of the light source from the main beam of the remitted measurement light being essentially the same as the distance of the light source from the measurement plane.

2. Spectral photometer according to claim 1, wherein the light source includes a combination of two or more light emitting diodes of different spectral characteristics located in one plane and positioned on a common carrier, whereby the plane is oriented essentially parallel to the measurement plane.

3. Spectral photometer according to claim 1, wherein the pickup arrangement includes a lens and an integrator rod, whereby the lens images a limited measurement spot in the measurement plane onto the entry surface of the integrator rod and the integrator rod integrates the measurement light over the measurement spot and guides it into the entry aperture of the spectrometer arrangement.

4. Spectral photometer according to claim 3, wherein the lens and the integrator rod are made in one piece.

5. Spectral photometer according to claim 1, further comprising a bright reference arrangement removably insertable into the beam path between the illumination arrangement and the pickup arrangement and located at a relatively large distance to the measurement plane, which reflects at least a part of the illumination light back onto the pickup arrangement.

6. Spectral photometer according to claim 5, wherein the bright reference arrangement is formed by redirecting mirrors and at least one attenuation element.

7. Spectral photometer according to claim 5, wherein the bright reference arrangement is formed by diffusely scattering surfaces.

8. Spectral photometer according to claim 5, wherein the bright reference arrangement is constructed as a shutter.

9. Spectral photometer according to claim 1, wherein the spectrometer arrangement includes an essentially pot-shaped spectrometer housing with an essentially cylindrical mantle and a removable cover, a concave diffraction grating positioned coaxially to the mantle in the spectrometer housing and resting on an annular shoulder formed on the mantle and complementary to the diffraction grating, and the cover forcing the diffraction grating against the annular shoulder at a predefined force by way of a pressure spring.

10. Spectral photometer according to claim 9, wherein the spectrometer housing with an end opposite the cover is positioned on and closed by a printed circuit plate including the entry aperture and the photoelectric receiver arrangement.

11. Spectral photometer according to claim 10, wherein the mantle of the spectrometer housing is equipped with positioning agents for engagement with complementary positioning agents formed in the printed circuit plate.

12. Spectral photometer according to claim 10, further comprising a clamping spring for fixing the cover to the mantle of the spectrometer housing and otherwise holding the spectrometer housing against the printed circuit plate.

13. Spectral photometer according to claim 9, wherein the spectrometer arrangement is athermalized.

14. Spectral photometer according to claim 9, wherein the spectrometer housing and the diffraction grating found therein are made of the same material with the same thermal expansion coefficient, so that relative movements caused by different heat expansion can only occur between the spectrometer housing as a whole and the printed circuit plate.

15. Spectral photometer according to claim 9, wherein the entry aperture and the photoelectric receiver arrangement are positioned eccentrically on the same side outside the optical axis of the diffraction grating.

16. Spectral photometer according to claim 9, wherein an additional photoelectric receiver is provided in the spectrometer housing and located in such a way that it is exposed by the diffraction grating to zero order measurement light.

17. Spectral photometer according to claim 10, wherein the pickup arrangement is directly mounted on that side of the printed circuit plate which is opposite the side of the spectrometer housing.

18. Spectral photometer according to claim 9, wherein the spectrometer housing and the diffraction grating are made of the same plastic material and are preferably manufactured by injection molding.

19. Spectral photometer according to claim 1, wherein a further photoelectric receiver is provided positioned in symmetry to the light source relative to the main beam of the pickup arrangement, which receives light directly reflected by the measured object at an angle of reflection of essentially 45°.

20. Spectral photometer according to claim 1, further comprising a control for maintaining a temperature of the light source constant.

21. Spectral photometer according to claim 20, wherein the control determines as a measure for the temperature of the light emitting diodes included in the light source the flow though voltage of the light emitting diodes at a constant measurement current which is much smaller than the normal operating current.

22. Spectral photometer according to claim 21, wherein the control controls the temperature of the light emitting diodes by variation of the on and off time depending on the determined flow though voltage.

23. Measurement head for a spectral photometer, comprising an illumination arrangement including at least one light source for the illumination at an angle of incidence of 45° of an object to be measured and located in a measurement plane, a pickup arrangement for capturing the measurement light remitted by the measured object at an angle of reflection of essentially 0° relative to the perpendicular to the measurement plane, a spectrometer arrangement including an entry aperture for the spectral splitting of the measurement light captured and fed through the entry aperture, and a photoelectric receiver arrangement exposed to the split measurement light for conversion of the individual spectral components of the measurement light into corresponding electrical signals, the at least one light source being constructed as a cosine emitter and located in such a way that its main radiation direction is essentially parallel to the main beam of the remitted measurement light and the mean distance of the light source from the main beam of the remitted measurement light being essentially the same as the distance of the light source from the measurement plane.

24. Measurement head according to claim 23, wherein the light source includes a combination of two or more light emitting diodes of different spectral characteristics located in one plane and positioned on a common carrier, whereby the plane is oriented essentially parallel to the measurement plane.

25. Measurement head according to claim 23, wherein the pickup arrangement has a lens and an integrator rod, whereby the lens images a limited measurement spot in the measurement plane onto the entry surface of the integrator rod and the integrator rod integrates the measurement light over the measurement spot and guides it into the entry aperture of the spectrometer arrangement.

26. Measurement head according to claim 25, wherein the lens and the integrator rod are made in one piece.

27. Measurement head according to claim 23, further comprising a bright reference arrangement removably insertable into the beam path between the illumination arrangement and the pickup arrangement and located at a relatively large distance to the measurement plane, which reflects at least a part of the illumination light back onto the pickup arrangement.

28. Measurement head according to claim 27, wherein the bright reference arrangement is constructed as a shutter.

29. Measurement head according to claim 23, wherein the spectrometer arrangement has an essentially pot-shaped spectrometer housing with an essentially cylindrical mantle and a removable cover, a concave diffraction grating positioned coaxially to the mantle in the spectrometer housing and resting on an annular shoulder formed on the mantle and complementary to the diffraction grating, and the cover forcing the diffraction grating against the annular shoulder at a predefined force by way of a pressure spring.

30. Measurement head according to claim 29, wherein the mantle of the spectrometer housing is equipped with positioning agents for engagement with complementary positioning agents formed in the printed circuit plate.

31. Measurement head according to claim 29, wherein the spectrometer arrangement is athermalized.

32. Measurement head according to claim 29, wherein the spectrometer housing and the diffraction grating found therein are made of the same material with the same thermal expansion coefficient, so that relative movements caused by different heat expansion can only occur between the spectrometer housing as a whole and the printed circuit plate.

33. Measurement head according to claim 23, wherein a further photoelectric receiver is provided positioned in symmetry to the light source relative to the main beam of the pickup arrangement, which receives light directly reflected by the measured object at an angle of reflection of essentially 45°

34. Measurement head according to claim 23, further comprising a control for maintaining a temperature of the light source constant.

35. Measurement head according to claim 34, wherein the control determines as a measure for the temperature of the light emitting diodes included in the light source the flow through voltage of the light emitting diodes at a constant measurement current which is much smaller than the normal operating current.

36. Measurement head according to claim 35, wherein the control controls the temperature of the light emitting diodes by variation of the on and off time depending on the determined flow through voltage.

* * * * *